(12) United States Patent
Yoda et al.

(10) Patent No.: US 7,095,512 B1
(45) Date of Patent: Aug. 22, 2006

(54) DOCUMENT PROCESS SYSTEM

(75) Inventors: Nobuhisa Yoda, Kamakura (JP);
Kazuaki Kidokoro, Yokohama (JP);
Tatsuya Haraguchi, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 851 days.

(21) Appl. No.: 09/641,335

(22) Filed: Aug. 18, 2000

(30) Foreign Application Priority Data

Aug. 23, 1999 (JP) ................................. 11-235489

(51) Int. Cl.
*G06F 15/00* (2006.01)
*H04N 1/00* (2006.01)
*G03G 15/00* (2006.01)

(52) U.S. Cl. .................... 358/1.13; 358/1.16; 358/1.17; 358/403; 399/81; 399/82; 399/382; 399/407; 399/85

(58) Field of Classification Search .............. 358/1.15, 358/1.16, 1.17, 403, 444, 1.13, 1.2; 399/81, 399/82, 85, 382, 407, 16, 76

See application file for complete search history.

(56) References Cited

U.S. PATENT DOCUMENTS

| | | | | |
|---|---|---|---|---|
| 5,568,281 A | * | 10/1996 | Kochis et al. | 358/475 |
| 5,764,866 A | * | 6/1998 | Maniwa | 358/1.15 |
| 5,841,548 A | * | 11/1998 | Mitome et al. | 358/296 |
| 5,848,325 A | * | 12/1998 | Matsumura | 399/83 |
| 5,940,543 A | * | 8/1999 | Isemura et al. | 382/284 |
| 6,084,988 A | * | 7/2000 | Kanno et al. | 382/289 |
| 6,100,994 A | * | 8/2000 | Schliekelmann et al. | 358/1.15 |
| 6,122,684 A | * | 9/2000 | Sakura | 710/73 |
| 6,144,777 A | * | 11/2000 | Tada et al. | 382/284 |
| 6,256,107 B1 | * | 7/2001 | Toda | 358/1.15 |
| 6,427,058 B1 | * | 7/2002 | Akiba et al. | 399/82 |
| 6,798,905 B1 | * | 9/2004 | Sugiura et al. | 382/168 |

* cited by examiner

*Primary Examiner*—Douglas Q. Tran
*Assistant Examiner*—Chan S. Park
(74) *Attorney, Agent, or Firm*—Foley & Lardner LLP

(57) ABSTRACT

A division/coupling process section refers to item "DOCUMENT PROCESS" in a division/coupling set information DB. If a document division/coupling process needs to be executed, division/coupling set information from the division/coupling set information DB is referred to. If scan parameters need to be referred to, the division/coupling process section refers to scan parameters from a scan parameter DB. If an inquire process needs to be executed by referring to item "EXCESS DOCUMENT PROCESS" in the division/coupling set information DB, necessary information is acquired from an input/output section through a division/coupling inquire process section. Thus, the document division/coupling is determined and executed. Information on the divided/coupled document is temporarily stored in a division/coupling buffer and also information on document registration is stored in the division/coupling buffer. The divided/coupled document is then registered into document management systems through a register process section.

12 Claims, 7 Drawing Sheets

FIG. 3

| ITEM | VALUE |
|---|---|
| RESOLUTION | 600dpi |
| SCAN TYPE | ADF DOUBLE SIDE |
| SHEET SIZE | A4 |
| SCAN SIZE | PHOTO |
| DIRECTION OF DOCUMENT | LANDSCAPE |

FIG. 4

| ITEM | VALUE 1 | VALUE 2 |
|---|---|---|
| 16 — DOCUMENT PROCESS | DIVIDE | |
| 17 — DOCUMENT PROCESS UNIT | 1 DOCUMENT FOR 4 PAGES | |
| 18 — EXCESS DOCUMENT PROCESS | REGISTER AS ONE DOCUMENT | |
| 19 — REGISTER PROCESS | DIVISION-REGISTER | |
| 20 { REGISTRATION DESTINATION 1: CONDITION | DOCUMENT MANAGEMENT SYSTEM A | SHEET SIZE: A4 |
| REGISTRATION DESTINATION 2: CONDITION | DOCUMENT MANAGEMENT SYSTEM B | SHEET SIZE: B4 |
| REGISTRATION DESTINATION 3: CONDITION | DOCUMENT MANAGEMENT SYSTEM C | SHEET SIZE: OTHER THAN A4 & B5 |

FIG. 5A

| SCAN ID (23) | DOCUMENT ID (24) | STATE (25) | REGISTRATION DESTINATION (26) |
|---|---|---|---|
| 1 | 1 | WAIT FOR REGISTRATION | DOCUMENT MANAGEMENT SYSTEM A |
| 1 | 2 | WAIT FOR REGISTRATION | DOCUMENT MANAGEMENT SYSTEM A |
| 2 | 3 | WAIT FOR REGISTRATION | DOCUMENT MANAGEMENT SYSTEM A |
| 2 | 4 | WAIT FOR REGISTRATION | DOCUMENT MANAGEMENT SYSTEM B |
| 2 | 5 | WAIT FOR REGISTRATION | DOCUMENT MANAGEMENT SYSTEM C |
| 3 | 6 | COUPLING | DOCUMENT MANAGEMENT SYSTEM A |
| : | : | : | : |

FIG. 5B

| SCAN ID (27) | DATA (28) |
|---|---|
| 1 | (DOCUMENT DATA) |
| 2 | : |
| 3 | : |
| 4 | : |
| 5 | : |
| : | : |

| ITEM | VALUE 1 | VALUE 2 |
|---|---|---|
| DOCUMENT PROCESS | DIVIDE | |
| DOCUMENT PROCESS UNIT | 1 DOCUMENT FOR 1 SHEET | |
| EXCESS DOCUMENT PROCESS | DELETE | |
| REGISTER PROCESS | NO DIVISION-REGISTER | DOCUMENT MANAGEMENT SYSTEM A |
| REGISTRATION DESTINATION 1 :CONDITION | | |
| REGISTRATION DESTINATION 2 :CONDITION | | |
| REGISTRATION DESTINATION 3 :CONDITION | | |

FIG. 7

| ITEM | VALUE 1 | VALUE 2 |
|---|---|---|
| DOCUMENT PROCESS | COUPLING | |
| DOCUMENT PROCESS UNIT | 1 DOCUMENT FOR 4 PAGES | |
| EXCESS DOCUMENT PROCESS | INQUIRE | |
| REGISTER PROCESS | NOT COUPLING-REGISTER | DOCUMENT MANAGEMENT SYSTEM A |
| REGISTRATION DESTINATION 1 :CONDITION | | |
| REGISTRATION DESTINATION 2 :CONDITION | | |
| REGISTRATION DESTINATION 3 :CONDITION | | |

FIG. 8

EXCESS PAGE PROCESS DESIGNATION

SCANNED DOCUMENT IS BEING DIVIDED IN UNITS OF 4 PAGES. SCANNED DOCUMENT CONSISTS OF 10 PAGES, AND 2 EXCESS PAGES REMAIN. HOW SHOULD THEY BE PROCESSED?

◎ DELETE EXCESS PAGE

◎ REGISTER EXCESS PAGE AS ONE DOCUMENT

◎ COUPLE EXCESS PAGE TO NEXT SCAN DOCUMENT

[ OK ]    [ CANCEL ]

FIG. 10

DOCUMENT PROCESS SYSTEM

CROSS-REFERENCE TO RELATED APPLICATIONS

This application is based upon and claims the benefit of priority from the prior Japanese Patent Application No. 11-235489, filed Aug. 23, 1999, the entire contents of which are incorporated herein by reference.

BACKGROUND OF THE INVENTION

The present invention relates to a document process system wherein documents, photographs, drawings, etc. are scanned and registered/transmitted to document management systems as electronic documents.

In conventional document process apparatuses, a document is normally scanned by a single operation and the scanned document is registered/transmitted to a single document management system as a single document.

In a case where a document scanned by a single operation is registered/transmitted to a document management system as a plurality of documents, the scanned document is divided by a specified method as in a case of a pattern-document process apparatus used for a special purpose.

In a case where a document scanned by a single operation is registered/transmitted to a plurality of document management systems as a single document, copies of the document are produced and the same data is registered/transmitted to the plural document management systems.

Where a variety of documents of many pages are scanned and registered/transmitted to a plurality of document management systems as electronic documents, an electronic document process rule, for example, for registering/transmitting electronic documents to the plural document management systems is predetermined and the documents are scanned and processed according to this rule. Thereby, the number of scan operations is reduced, and more efficient document processing is achieved.

In this document process method, however, the methods for predetermining the electronic document process rule for reducing the number of scan operations do not include a method for dividing a document scanned by a single scan operation into a plurality of documents. Because of this, the user has to divide a document at the time of scanning and to repeat the scan operation for each of divisions of the document.

Moreover, it is not possible that the document scanned by a single operation is divided and the divided documents are registered/transmitted to a plurality of document management systems. Furthermore, it is not possible that documents scanned by plural scan operations are coupled and the coupled document is registered/transmitted to a document management system as a single document.

In the case of the pattern document process apparatus used for a special purpose, the document scanned by a single operation can be registered as a plurality of documents. In this case, however, a mechanism for dividing the scanned document is incorporated in a process for registering documents, and this apparatus differs in objective from the apparatus for processing electronic documents by referring to the predetermined process rule. Consequently, there are problems: difficulty in changing the process rule by the user, a low degree of freedom of the process rule, and infeasibility of application to the processing of non-pattern documents.

In the case of producing copies of a document and registering/transmitting the same data to a plurality of document management systems, a document scanned by a single operation is not divided. Consequently, where different data is registered/transmitted to a plurality of document management systems, the user has to divide a document at the time of scan and to repeat the scan operation for each of divisions of the document.

BRIEF SUMMARY OF THE INVENTION

The object of the present invention is to provide a document process system capable of enhancing flexibility of document processing and realizing an efficient scan operation.

In order to achieve this object, according to an aspect of the present invention, there is provided a document process system for reading a document, a photograph, a drawing, or the like, and registering/transmitting read data as an electronic document into a plurality of document management systems, the system comprising:

input section for inputting a condition for dividing/coupling the read electronic document and reconstructing the electronic document, and document registration information;

document division/coupling process section for dividing/coupling the electronic document read by a single operation, on the basis of the condition input by the input section;

buffer for temporarily storing the electronic document divided/coupled by the document division/coupling process section, and the document registration information input by the input section; and document register process section for executing document registration to a predetermined one of the document management systems on the basis of the electronic document and the document registration information stored in the buffer.

According to another aspect of the invention, there is provided a document process system for scanning a document, a photograph, a drawing, or the like, and registering/transmitting an acquired scan document as an electronic document into a plurality of document management systems, the system comprising:

a division/coupling set information input/output section for setting a condition for dividing/coupling the scan document and reconstructing a document;

a division/coupling set information database for storing the set condition;

a division/coupling set process section for storing the condition set by an operator through the division/coupling set information input/output section into the division/coupling set information database; and a division/coupling process section for executing a division/coupling process for the scan document by referring to contents in the division/coupling set information database, wherein the document is divided/coupled on the basis of the condition preset through the division/coupling set information input/output section and stored in the division/coupling set information database.

According to still another aspect of the invention, there is provided a document process system for scanning a document, a photograph, a drawing, or the like, and registering/transmitting an acquired scan document as an electronic document into a plurality of document management systems, the system comprising:

a scan parameter recognition section for discriminating scan-related information collected by a scan process section at a time of document scan, and generating scan parameter data including information necessary for a division/coupling process;

a scan parameter database for storing the scan parameter data; and a division/coupling process section for executing the division/coupling process for the scan document by referring to contents in the scan parameter database on an as-needed basis, wherein the division/coupling process is automatically executed by determining the condition for document division/coupling on the basis of the data stored in the scan parameter database.

According to still another aspect of the invention, there is provided a document process system for scanning a document, a photograph, a drawing, or the like, and registering/transmitting an acquired scan document as an electronic document into a plurality of document management systems, the system comprising:

a division/coupling set information input/output section for setting a condition for dividing the scan document and registering the divided scan documents into a plurality of document management systems;

a division/coupling set information database for storing the set condition;

a division/coupling set process section for storing the condition set by an operator through the division/coupling set information input/output section into the division/coupling set information database; and a division/coupling process section for executing a division/coupling process for the scan document by referring to contents in the division/coupling set information database, wherein the document is divided/coupled to be registered/transmitted to the plurality of document management systems, on the basis of the condition preset through the division/coupling set information input/output section and stored in the division/coupling set information database.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows an example of a scheme of data stored in a scan parameter database (DB);

FIG. 4 shows an example of a scheme of data stored in a division/coupling set information DB;

FIGS. 5A and 5B show an example of scheme of data stored in a division/coupling buffer;

FIG. 7 shows an example of division/coupling set information;

FIG. 8 shows an example of division/coupling set information;

FIG. 10 shows an example of display of an division/coupling inquiry.

DETAILED DESCRIPTION OF THE INVENTION

An embodiment of the present invention will now be described with reference to the accompanying drawings.

Figure 1:
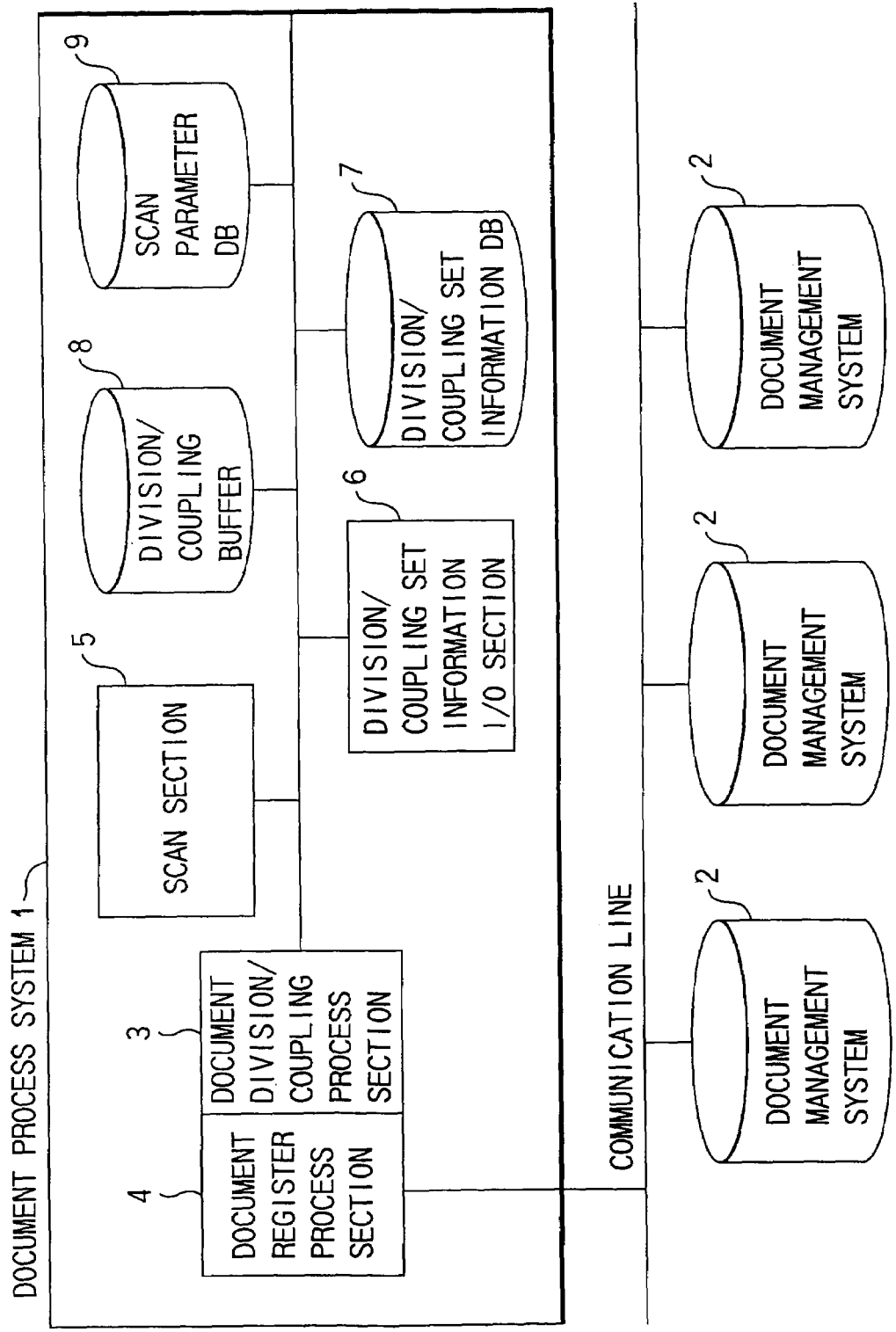
FIG. 1 is a block diagram showing the structure of a document process system according to an embodiment of the present invention.

FIG. 1 is a block diagram showing the structure of a document process system according to an embodiment of the present invention. A document process system 1 is connected to two or more document management systems 2 over a communication line.

Specifically, the document process system 1 comprises a document division/coupling process section 3, a document register process section 4, a scan section 5, a division/coupling set information input/output (I/O) section 6, a division/coupling set information database (DB) 7, a division/coupling buffer 8, and a scan parameter DB 9.

Figure 2:
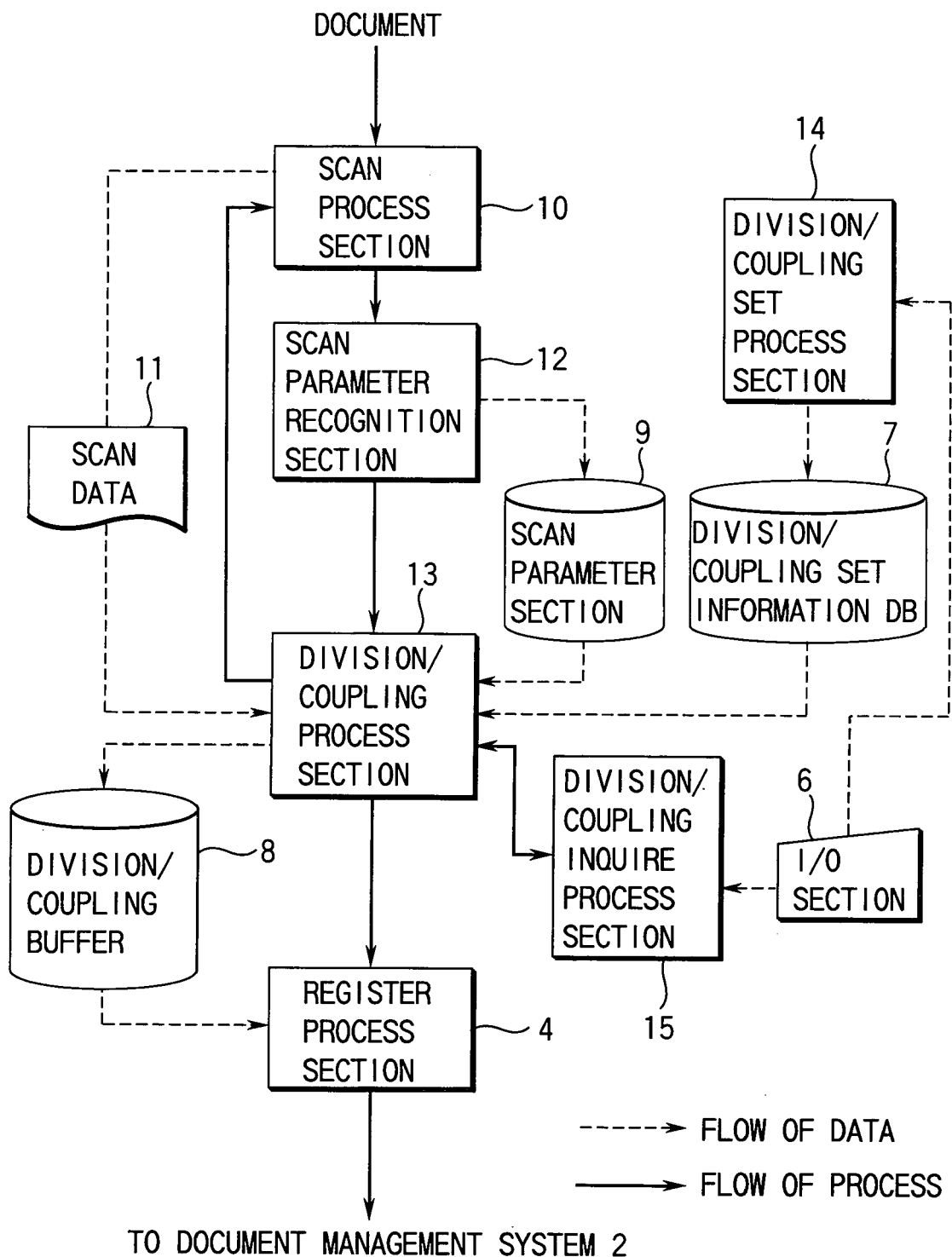
FIG. 2 is a view for describing an outline of processes in the document process system according to the embodiment.

The document division/coupling process section 3 is a module which realizes a document division/coupling function according to the present invention. The document register process section 4 is a module which realizes a document register/document division register function according to the invention. Thereby, processes illustrated in FIG. 2 are carried out, as will be described later.

The scan section 5 is an interface for taking in a document. The division/coupling set information I/O section 6 is an interface for an input operation relating to document division/coupling setting.

A description of the scan section 5 may be omitted since it is the same as a prior-art scan section. Examples of display on the division/coupling set information I/O section 6 will be described later. There is no limitations to the mode in which a display portion of the division/coupling set information I/O section 6 is provided. For example, the display portion may be provided on a scan apparatus including the scan section 5. Alternatively, a virtual display process section such as a Web server may be provided in the document process system 1 and a remote browser may, in actuality, be displayed.

The division/coupling set information DB 7 stores rules for dividing/coupling document(s). The division/coupling buffer 8 is a storage area required in a process of registering reconstructed divided/coupled documents into the document management systems 2. The scan parameter DB 9 stores information relating to a document scan state in the scan section 5. The data schemes in the division/coupling set information DB 7, division/coupling buffer 8 and scan parameter DB 9 will be described later.

FIG. 2 is a view for describing an outline of processes in the document process system 1 according to the embodiment. In this system, a document is taken in by a scan process section 10 and converted to electronic scan data 11. Following the scan process section 10, a scan parameter recognition section 12 is executed and information relating to the scan state, including information necessary for a document division/coupling process, is stored in the scan parameter DB 9. The scan process section 10 and scan parameter recognition section 12 correspond to the scan section 5 in FIG. 1.

Then, the scan data is subjected to a division/coupling process in a division/coupling process section 13. When this process is executed, the division/coupling process section 13 refers to the information stored in the division/coupling set information DB 7 and scan parameter DB 9. Based on the set information, the process is executed. The information stored in the division/coupling set information DB 7 is information which is registered by a division/coupling set process section 14 on the basis of data input by the operator through the division/coupling set information I/O section (hereinafter referred to as "I/O section") 6. Where information input by the operator is necessary when the division/coupling set process section 14 is to carry out the process, a division/coupling inquire process section 15 causes the I/O section 6 to display an information content for prompting the information input. In this case, the input information is reflected on the document processing. The division/coupling process section 13, division/coupling set process section 14 and division/coupling inquire process section 15 correspond to the document division/coupling process section 3 in FIG. 1.

The document data processed in the division/coupling process section 13 is temporarily stored in the division/coupling buffer 8 and then registered in each document management system 2 through the document register process section 4.

FIG. 3 shows an example of a scheme of data stored in the scan parameter DB 9. The scan parameter DB 9 stores information selected by an auto-discrimination function of the scan process section 10 when a document is scanned, and information designated by the operator when a document is scanned.

FIG. 4 shows an example of a scheme of data stored in the division/coupling set information DB 7. The division/coupling set information DB 7 stores items of "DOCUMENT PROCESS" 16, "DOCUMENT PROCESS UNIT" 17, "EXCESS DOCUMENT PROCESS" 18, "REGISTER PROCESS" 19 and "REGISTRATION DESTINATION" 20.

Item "DOCUMENT PROCESS" 16 designates a document processing method, that is, division, coupling, division/coupling, or non-processing. Item "DOCUMENT PROCESS UNIT" 17 designates a process unit for a process designated by "DOCUMENT PROCESS."

Item "EXCESS DOCUMENT PROCESS" 18 designates a process content to be executed for an excess document (or excess page(s)) which may remain as a result of the division/coupling of a document on the basis of a document process unit. Item "REGISTER PROCESS" 19 designates a document registration method, that is, execution of division-registration or non-execution of division-registration. If division-registration is not executed, the document management system at a registration destination is designated. Item "REGISTRATION DESTINATION" 20 designates each registration destination and a registration condition for division-registration when the division-registration has been designated in item "REGISTER PROCESS."

FIGS. 5A and 5B show an example of scheme of data stored in the division/coupling buffer 8. The division/coupling buffer 8 comprises a data table 21 for managing document data itself, and a registration information table 22 storing registration information on document data, etc.

The registration information table 22 shown in FIG. 5A stores a scan ID 23, which is an identifier for a scan execution unit at the time of a scan operation; a document ID 24, which is an identifier for a document unit obtained after execution of the division/coupling process; a state 25 indicating a current state of each document in the buffer; and a registration destination 26 representing a registration destination of each document.

The data table 21 shown in FIG. 5B stores a document ID 27 which is an identifier for a document unit obtained after the execution of the division/coupling process, and data 28 which is document data itself of each document.

Figure 6:
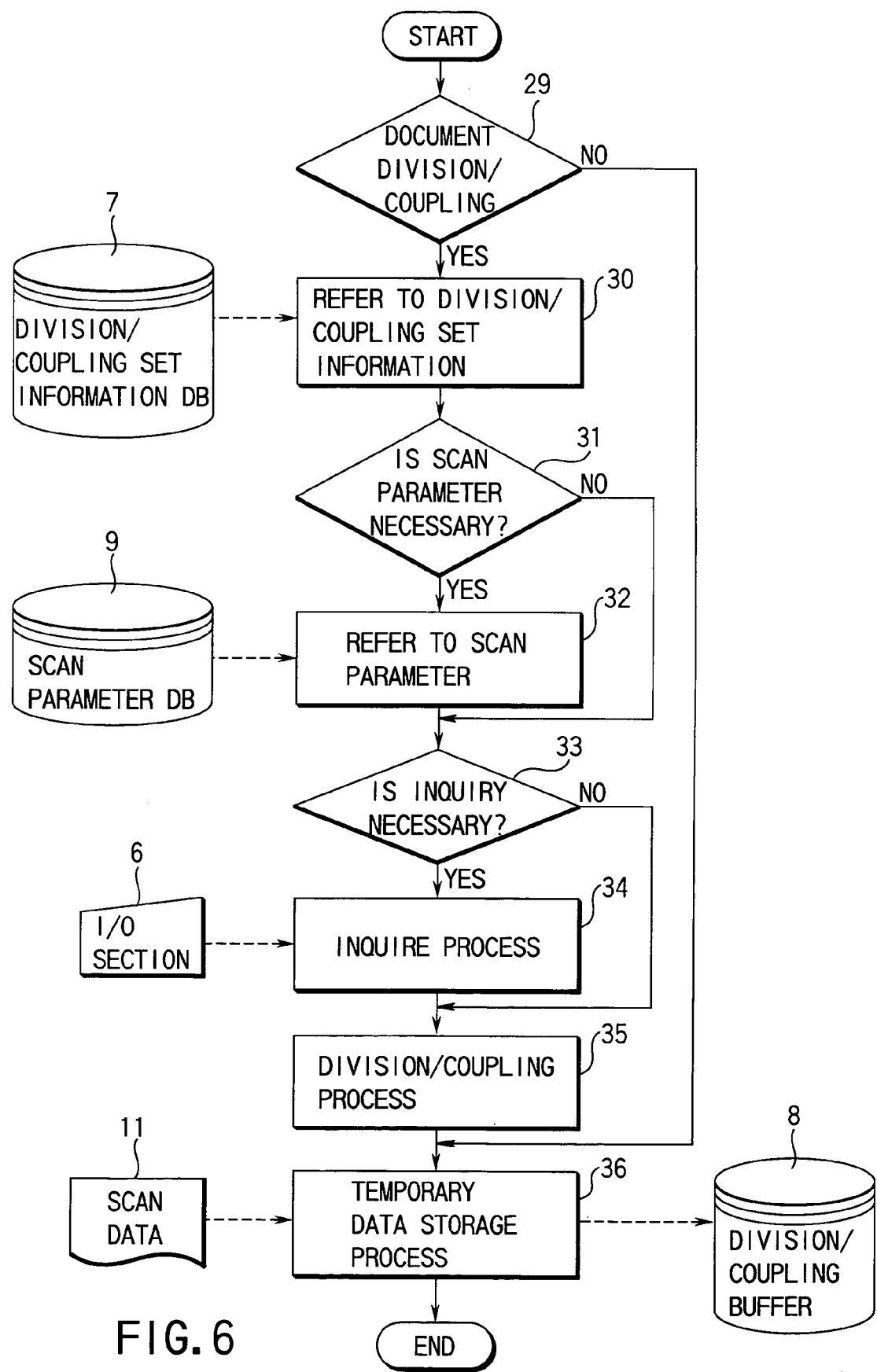
FIG. 6 is a flow chart illustrating a process carried out in a division/coupling process section.

A process operation in the division/coupling process section 13 with the above structure will now be described with reference to a flow chart of FIG. 6.

To start with, in step 29, item "DOCUMENT PROCESS" 16 in the division/coupling set information DB 7 is referred to. If a document division/coupling process is necessary, control goes to step 30. If not, control goes to step 36.

In step 30, division/coupling set information from the division/coupling set information DB 7 is referred to.

In step 31, item "DOCUMENT PROCESS UNIT" 17 in the division/coupling set information DB 7 is referred to. If it is necessary to refer to the scan parameter, control goes to step 32. If not, control goes to step 33.

In step 32, the scan parameter from the scan parameter DB 9 is referred to.

In step 33, item "EXCESS DOCUMENT PROCESS" 18 from the division/coupling set information DB 7 is referred to. If an inquire process is necessary, control goes to step 34. If not, control goes to step 35.

In step 34, the inquire process is executed and necessary information is acquired from the I/O section 6.

In step 35, division/coupling of the document is determined and executed.

In step 36, information relating to the divided/coupled document is temporarily stored in the division/coupling buffer 8 and also information relating to the registration of the document is stored in the division/coupling buffer 8.

A specific example of the document process will now be described with reference to FIGS. 3, 4, 5A and 5B.

In the example in FIG. 4, a process rule "a document is divided to produce division documents in units of 4 pages, and the division documents are registered" is determined. Assume that a document of 10 pages in total (consisting of four A4-size pages, four B5-size pages, and two B4-size pages in the named order) has been scanned (this case corresponding to scan ID=2 in FIG. 5A). If the obtained scan data is divided according to the process rule in FIG. 4, two documents each consisting of 4 pages and one document consisting of 2 pages are produced. In addition, according to the division-registration rule in FIG. 4, one of the 4-page documents (document ID=3 in FIG. 5A) is registered into the document management system A, the other (document ID=4 in FIG. 5A) into the document management system B, and the 2-page document (document ID=5 in FIG. 5A) into the document management system C.

Figure 9A:
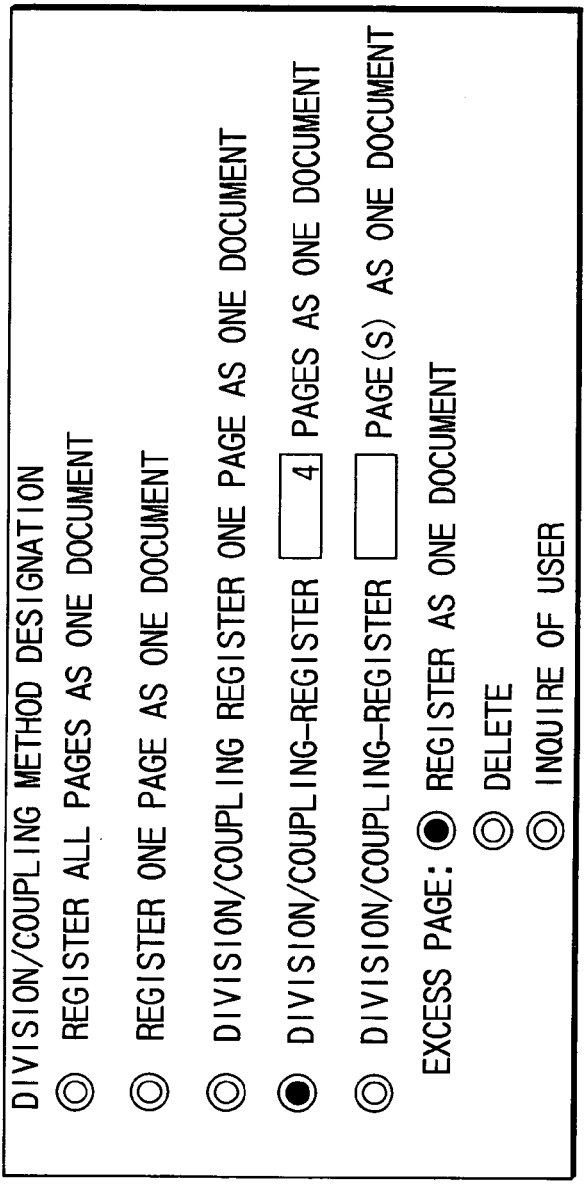
FIGS. 9A and 9B show examples of display of division/coupling set information.
Figure 9B:
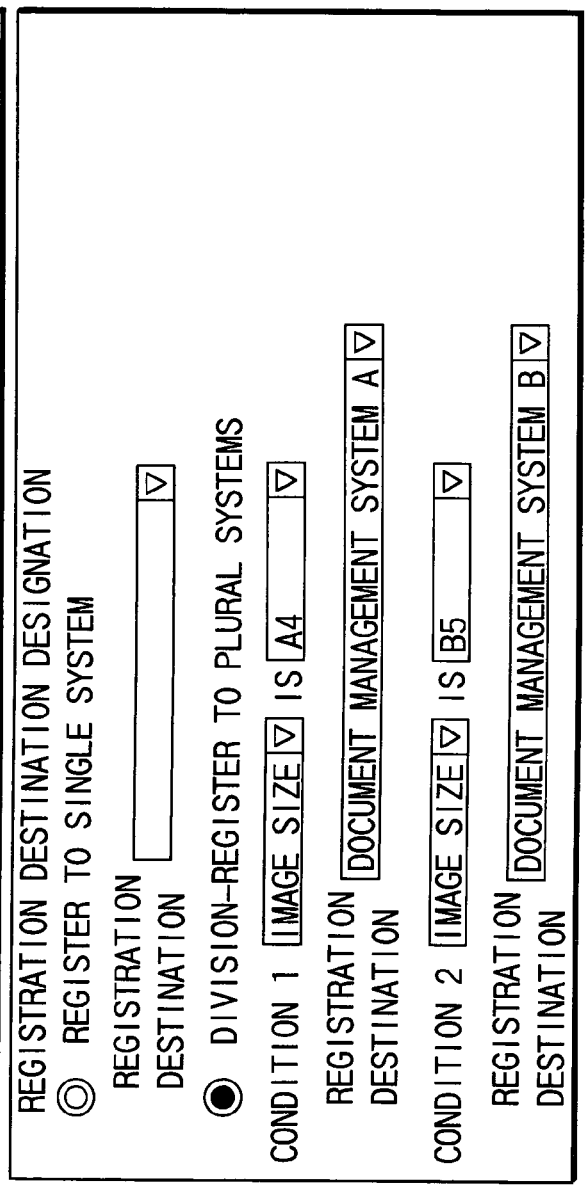

The division/coupling set information shown in FIG. 4 is input in advance by the operator through the user interface, as illustrated in FIGS. 9A and 9B by way of example.

A document process with division/coupling set information shown in FIG. 7 will now be described.

In the example in FIG. 7, a process rule "a document is divided to produce division documents in units of 1 sheet, and the division documents are registered" is determined. Assume that a document of 2 sheets in total (this case corresponding to scan ID=1 in FIG. 5A) has been executed, and scan parameters as shown in FIG. 3 have been recorded. In the example in FIG. 3, the scan type is "ADF DOUBLE-SIDE" and thus scan data of 4 pages of the 2 sheets is acquired. According to the process rule indicated in FIG. 7, the scan data is divided to produce two documents each consisting of two pages (document ID=1, 2 in FIG. 5A). Both documents are registered into the document management system A according to the registration rule in FIG. 7.

Of the scan parameters in FIG. 3, the "SCAN TYPE" is used as a factor in automatically determining the number of pages of "one sheet" designated in FIG. 7.

A document process with division/coupling set information shown in FIG. 8 will now be described.

In the example in FIG. 8, a process rule "documents are coupled to produce documents in units of 4 pages, and the coupled documents are registered" is determined. Assume that a document of 2 pages in total (this case corresponding to scan ID=3 in FIG. 5A) has been executed. According to the process rule indicated in FIG. 8, the scan data is processed to produce a document consisting of 2 pages. In this case, since a document of 4 pages is not produced, this document is stored in the buffer as "an excess document" in the state of "coupling" (document ID=6 in FIG. 5A). Since item "EXCESS DOCUMENT PROCESS" in FIG. 8 designates "INQUIRE" to the operator, a user interface as shown in FIG. 10 is displayed.

As has been described above, according to the embodiment of the present invention, a plurality of documents can be registered by a single operation ("facility in operation").

Different documents can be registered into a plurality of document management systems by a single operation ("facility in operation").

A plurality of documents can be coupled into one document and this document can be registered ("facility in operation" and "flexibility of process").

Rules relating to document processing can be input in advance ("flexibility and diversity of process").

A process content for a document can be automatically determined ("flexibility and diversity of process").

Destinations of registration of divided documents can be individually designated ("facility in operation" and "flexibility of process").

Information necessary for document processing can be acquired from the operator on the spot ("flexibility and diversity of process").

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A document process system comprising:
a scan process section which reads documents, photographs and drawings, so as to obtain an electronic document;
a scan parameter recognition section which recognizes information regarding a scan condition including information required for executing a division/coupling process with respect to the electronic document obtained at the scan process section;
a scan parameter database which stores the information recognized by the scan parameter recognition section;
a division/coupling process section which executes a division/coupling process with respect to the electronic document by referring to the information stored in the scan parameter database;
an input section which inputs information, when information input is required during execution of the division/coupling process at the division/coupling process section;
a register process section which registers processed document data, when the division/coupling process is executed by referring to the information input from the input section and the information stored in the scan parameter database; and
a division/coupling set information database which stores set information regarding a document to be divided or coupled, wherein the set information includes excess document process information regarding a first process to be performed on an excess part of the electronic document after having been divided by the division/coupling process section, wherein the first process is capable of being set different from a second process by which a non-excess part of the electronic document is operated upon.

2. The document process system according to claim 1, wherein said input section is provided with a display for inputting a condition for dividing the read electronic document and reconstructing the electronic document.

3. The document process system according to claim 2, wherein said division/coupling process section divides the electronic document read by a plurality of operations, on the basis of the condition input by the input section.

4. The document process system according to claim 1, wherein said division/coupling process section comprises a division process means, a division set process means, and a division inquire process means.

5. The document process system according to claim 4, wherein said division set process means sets division information on the basis of the condition input by the input section.

6. The document process system according to claim 5, wherein said division process means divides the electronic document on the basis of the division information set by the division set process means.

7. The document process system according to claim 6, wherein said division inquire process means executes a process to prompt information input where the information input is required at a time of a process execution in the division process means.

8. The document process system according to claim 1, wherein the register process section executes document registration to a predetermined one of a plurality of document management systems on the basis of the electronic document and document registration information.

9. The document process system according to claim 1, further comprising a division/coupling buffer, wherein the electronic document divided by the division/coupling process means is stored in the division/coupling buffer as a plurality of separate and distinct electronic documents.

10. A document process system comprising:
scan process means for reading documents, photographs and drawings, so as to obtain an electronic document;
scan parameter recognition means for recognizing information regarding a scan condition including information required for executing a division/coupling process with respect to the electronic document obtained by the scan process means;
scan parameter storage means for storing the information recognized by the scan parameter recognition means;

division/coupling process means for executing a division/coupling process with respect to the electronic document by referring to the information stored in the scan parameter storage means;

input means for inputting information, when information input is required during execution of the division/coupling process by the division/coupling process means;

register process means for registering processed document data, when the division/coupling process is executed by referring to the information input from the input means and the information stored in the scan parameter storage means; and division/coupling set information storage means for storing set information regarding a document to be divided or coupled, wherein the set information includes excess document process information regarding a first process to be performed on an excess part of the electronic document after having been divided by the division/coupling process means, wherein the first process is capable of being set different from a second process by which a non-excess part of the electronic document is operated upon.

11. The document process system according to claim 10, wherein said division/coupling process means couples the electronic document read by a plurality of operations, on the basis of the condition input by the input means.

12. The document process system according to claim 10, wherein said division/coupling process means comprises a coupling process means, a coupling set process means, and a coupling inquire process means.

* * * * *